Sept. 27, 1932.  R. H. CRAMER  1,879,110
GRINDING
Filed Oct. 21, 1930  2 Sheets-Sheet 2
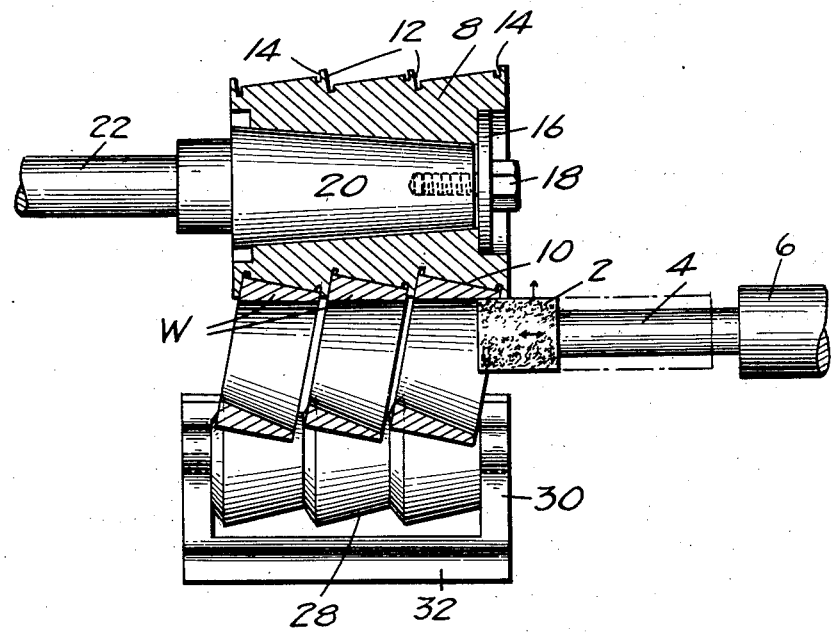
Fig_2_
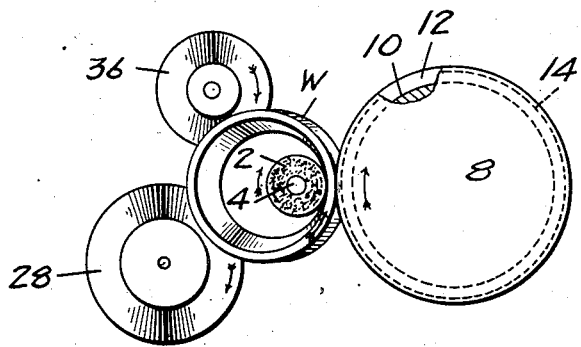
Fig_3_
INVENTOR
RAYMOND H. CRAMER
BY
HIS ATTORNEY Patented Sept. 27, 1932

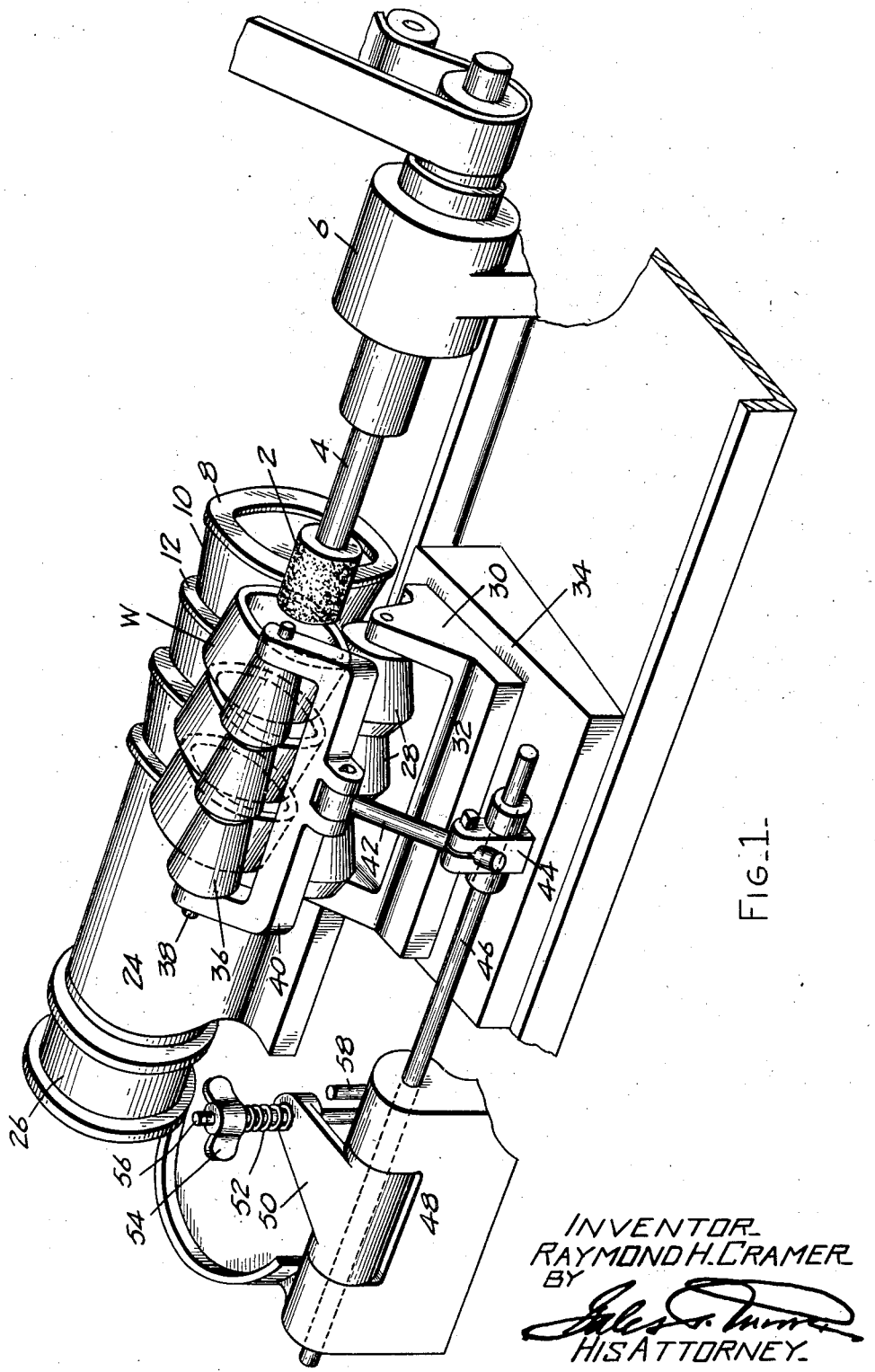

1,879,110

UNITED STATES PATENT OFFICE

RAYMOND H. CRAMER, OF NEWARK, NEW JERSEY, ASSIGNOR TO GENERAL MOTORS CORPORATION, OF DETROIT, MICHIGAN, A CORPORATION OF DELAWARE

GRINDING

Application filed October 21, 1930. Serial No. 490,146.

This invention relates to grinding and comprises all the features and aspects of novelty herein disclosed. The invention is disclosed, by way of example, by reference to the multiple grinding of tapered interior walls of a plurality of race rings.

According to a common present-day practice of grinding tapered bores, the article is rotated approximately on its axis by a chuck while a grinding wheel traverses the internal surface at an angle to the article axis. The product is subject to the usual imperfections and disadvantages which are inherent when a chuck is employed, among them the frequent off-center holding of the work with consequent variation in wall thickness, slow production, even with skilled operators, and poor heat dissipation with consequently imperfect sizing. Furthermore, only one article can be ground at a chucking because a chuck can rotate around only one axis.

An object of the invention, accordingly, is to provide an improved method and apparatus for grinding tapered bores in a manner to avoid the above and other disadvantages. Another object is to provide a method and apparatus for multiple grinding of tapered bores in a plurality of articles. In the disclosure selected for illustrative purposes, the articles are race rings which are externally cylindrical and internally conical. Also the articles are shown as of the same diameter, of the same wall thickness and of the same internal taper but the benefits of the invention are obtainable when the articles have different characteristics.

To these ends and to improve generally and in detail upon methods and apparatus of this character, the invention also consists in the various matters hereinafter described and claimed. In the drawings, Fig. 1 is a perspective view of the apparatus.

Fig. 2 is a horizontal sectional view of a portion of the apparatus and

Fig. 3 is a diagrammatic end view of certain important elements.

A grinding wheel 2 is rotated by a spindle 4 journalled on a head 6 which may be carried by a cross feed slide (not shown) on a reciprocating table such as is common with bore grinding machines. This provides for the usual axial reciprocation of the wheel and a cross feed radially. If desired, the wheel 2 may be of sufficient length, as indicated by the broken lines in Fig. 2, to always bear on a plurality of articles W, herein shown as race rings with tapered bores. The rings are arranged in a tilted or canted relation such that one element only in the tapered bore wall of each ring lies in a given straight line where the periphery of the wheel 2 engages all of them, or will engage them upon axial reciprocation of the wheel. The rings are rotated on their individual axes by a control or backing wheel 8 comprising stepped cone surfaces 10 each presenting a line of contact to the canted external periphery of a ring. There are also steep abutment cone faces 12 which limit endwise movement of the rings by engaging their thicker ends. Most of the pressure of the grinding wheel is exerted transversely, in the direction of the lines where the rings are externally supported, and a component of the pressure is exerted against the abutment faces 12. If desired, the wheel 8 may also have small projecting faces 14 to make grooves or channels for the rings, thus affording material for increasing the height of the faces 12. The grinding wheel engages the internal walls of the several rings along a common straight line which is on the opposite side of the bore walls from those lines where the rings are externally supported. This insures uniform wall thickness of the rings all around the periphery (at any given distance from a side wall). When the rings are externally cylindrical and also have the same internal taper, the side walls of the rings are parallel and the axes of the rings are also parallel and make the same angle with the axis of the grinding wheel. The axes of the rings are thus not coincident but remain in the same plane which plane also includes the axis of the grinding wheel as the latter is fed towards the backing wheel 8. The same relation of the rings to the grinding wheel is constantly preserved as the rings rotate on their individual axes. The wheel 8 is removably clamped by a washer 16 and nut 18 to a coned surface 20 of a shaft 22 which is journalled in a bearing 24 and driven by a pulley 26.

As a further support to the rings, their peripheries have line contact with stepped conical faces on an idler wheel 28 journalled on a shaft which is carried by lugs 30 of a slide 32. The slide is desirably supported on an incline 34 so that adjustment up or down the incline will provide for support of rings of any diameter at the same level, that is it will locate the axes of all rings in the plane connecting the centers of the wheels 2 and 8. To insure sufficient pressure between the wheel 8 and the rings to control rotation, an idler wheel 36, having stepped conical faces, bears with line contact against the rings at another location above center. The idler wheel 36 is journalled for rotation on a shaft 38 carried by a yoke 40 which is keyed to a rock arm 42. The arm is clamped to a block 44 keyed to a rock shaft 46 journalled in a bearing lug 48 of the frame. The rock shaft has an arm 50 pressed downwardly by a coil spring 52 which bears against a wing nut 54 threaded on a rod 56 which is connected to the frame. The action of the spring is to create a yielding downward pressure of the wheel 36 against the rings but the wheel can be readily lifted to insert or remove work, as by a plunger 58 striking the arm 50. The grinding wheel is rotated at usual grinding speed and the control or backing wheel 8 is driven at a speed which will revolve the work about as fast as the usual chuck of a bore grinding machine. Any suitable gauge may be employed for gauging the bore and its accuracy is enhanced by the possibility of keeping the work cool and unexpanded, the work having only a constantly changing line contact with the wheels and being exposed both internally and externally to cooling fluid. Direction of rotation of the wheels is preferably that indicated by the arrows in Fig. 3. Although the grinding wheel is described as having axial reciprocation and cross feed in the direction indicated by arrows in Fig. 2, it is apparent that the work supporting wheels may have axial reciprocation or cross feed, or both.

I claim:

1. The method of grinding simultaneously the tapered bore walls of a plurality of rings, which consists in supporting the rings in a canted position such that one element only in the tapered bore wall of each ring is in a given straight line, rotating the rings while constantly keeping one element of each ring in the given straight line, and presenting a grinding tool to all the bore walls for contact with the rings at the common line of said elements; substantially as described.

2. The method of grinding simultaneously the tapered bore walls of a plurality of rings, which consists in supporting the rings in a canted position such that one element only in the tapered bore wall of each ring is in a given straight line, rotating the rings while constantly keeping one element of each ring in the given straight line, presenting a grinding tool to all the bore walls for contact with the rings at the common line of said elements, and causing relative cross feeding movement between the tool and the rings along a line connecting the axis of a ring to said common line; substantially as described.

3. The method of grinding simultaneously the tapered bore walls of a plurality of rings, which consists in supporting the rings with their side walls in parallelism and with one element only of the bore wall of one ring in line with one element only of the bore wall of another ring, rotating the rings on their individual axes as thus supported, and presenting a grinding tool to the bore walls for contact with the rings only at the common line of said elements; substantially as described.

4. The method of grinding simultaneously the tapered bore walls of a plurality of articles, which consists in supporting the articles in a canted position such that one element only in the tapered bore wall of each article is in a given straight line, rotating the articles around their individual axes, and presenting a grinding tool to the bore walls for contact with the articles only along the common line of said elements; substantially as described.

5. The method of grinding simultaneously the tapered bore walls of a plurality of rings, which consists in supporting the rings in such a relation that their axes are out of coincidence with one another, rotating the rings on their individual axes in said relation, and presenting a grinding tool to the bore wall of each ring along a line making an angle with the axis of the ring; substantially as described.

6. The method of grinding the tapered bore wall of a ring, which consists in rollingly supporting the ring along an element of its outer peripheral surface, supporting the ring, against transverse pressure, along another element of its outer surface, rotating the ring on its axis while so supported, presenting a grinding tool to the bore wall along a line lying at an angle to the axis of the ring, and causing relative transverse movement between the tool and the ring in a plane extending through one of the elements where the ring is externally supported and through the line where the tool engages the ring while maintaining the angle constant between the axis of the ring and said line where the tool engages the ring; substantially as described.

7. In a machine for grinding the tapered bore walls of a plurality of rings, a grinding wheel adapted to engage the bore walls of the rings along a common straight line, a supporting wheel having a plurality of coaxial surfaces of revolution, each surface presenting an individual line of contact to the external periphery of one of the rings, and each of said lines of contact lying at an angle to said common straight line to position the rings in canted relation to the grinding wheel; substantially as described.

8. In a machine for grinding the tapered bore walls of a plurality of rings, a grinding wheel adapted to engage the bore walls of the rings along a common straight line, a supporting wheel having a plurality of coaxial surfaces of revolution, each surface presenting an individual line of contact to the external periphery of one of the rings, and means for causing a relative feeding movement of approach between the grinding wheel and the supporting wheel in a plane containing said lines of contact and said common line; substantially as described.

9. In a machine for grinding the tapered bore walls of a plurality of rings, a grinding wheel adapted to engage the bore walls of the rings along a common straight line, a supporting wheel having a plurality of conical surfaces, each surface presenting an individual line of contact to the external periphery of one of the rings, said conical surfaces positioning the rings in a canted relation to the grinding wheel; substantially as described.

10. In a machine for grinding the tapered bore walls of a plurality of rings, a grinding wheel adapted to engage the bore walls of the rings along a common straight line, a supporting wheel having a plurality of coaxial surfaces of revolution, each surface presenting an individual line of contact to the external periphery of one of the rings, the wheel also having an abutment shoulder for each surface of revolution, and each of said lines of contact lying at an angle to said common straight line; substantially as described.

11. In a machine for grinding the tapered bore walls of a plurality of rings, a grinding wheel adapted to engage the bore walls of the rings along a common straight line, a supporting wheel having a plurality of coaxial surfaces of revolution, each surface presenting an individual line of contact to the external periphery of one of the rings, the wheel also having an abutment shoulder for each surface of revolution, means for causing a relative feeding movement of approach between the grinding wheel and the supporting wheel in a plane containing said lines of contact and said common line, and each of said lines of contact lying at an angle to said common line whereby said rings are pressed against said shoulders and against said surfaces of revolution; substantially as described.

12. In a machine for grinding the tapered bore walls of a plurality of rings, a grinding wheel adapted to engage the bore walls of the rings along a common straight line, a supporting wheel having a plurality of coaxial surfaces of revolution, each surface presenting an individual line of contact to the external periphery of one of the rings, each of said lines of contact lying at an angle to said common straight line, and a second supporting member for engaging the rings at another location; substantially as described.

13. In a machine for grinding the tapered bore walls of a plurality of rings, a grinding wheel adapted to engage the bore walls of the rings along a common straight line, a supporting wheel having a plurality of conical surfaces and abutment shoulders, each surface presenting an individual line of contact to the external periphery of one of the rings, and a second supporting wheel having a plurality of supporting surfaces, each opposing one of said conical surfaces; substantially as described.

14. In a machine for grinding the tapered bore wall of a ring, a grinding wheel adapted to engage the bore wall of the ring, a supporting wheel having a shoulder to engage the end of the ring and a surface presenting a line of contact to the external periphery of the ring, and said line of contact lying at an angle to the axis of the grinding wheel; substantially as described.

15. In a machine for grinding the tapered bore wall of a ring, a grinding wheel adapted to engage the bore wall of the ring, a supporting wheel having a shoulder to engage the end of the ring and a surface presenting a line of contact to the external periphery of the ring, and means for causing a relative feeding movement of approach between the grinding wheel and the supporting wheel in a plane containing said line of contact and the axis of the wheel; substantially as described.

16. In a machine for grinding the tapered bore wall of a ring, a grinding wheel adapted to engage the bore wall of the ring, a supporting wheel having a conical surface to engage the external periphery of the ring, and a second wheel having a supporting surface to engage the ring at another location, said surfaces holding the ring in canted relation to the grinding wheel; substantially as described.

17. In a machine for grinding bore walls in a plurality of rings, supporting devices for the rings, at least one of said devices comprising a rotary wheel having a plurality of coaxial surfaces of revolution, said surfaces having lines of contact with the external peripheries of said rings and being arranged to revolubly support the rings with their axes in the same plane but out of coincidence with one another, a grinding wheel, and means for causing relative feeding movement of approach between the grinding wheel and said rotary wheel, said feed movement being in said plane containing the non-coincident axes of the rings and also containing the axis of the grinding wheel; substantially as described.

In testimony whereof I hereunto affix my signature.

RAYMOND H. CRAMER.